(12) United States Patent
Mogre et al.

(10) Patent No.: US 8,169,542 B2
(45) Date of Patent: May 1, 2012

(54) AUTOMATIC FORMAT IDENTIFICATION OF ANALOG VIDEO INPUT SIGNALS

(75) Inventors: Advait Mogre, Sunnyvale, CA (US); Charles Thomas Monahan, Mountain View, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1248 days.

(21) Appl. No.: 11/862,876

(22) Filed: Sep. 27, 2007

(65) Prior Publication Data

US 2008/0100742 A1 May 1, 2008

Related U.S. Application Data

(60) Provisional application No. 60/854,759, filed on Oct. 27, 2006.

(51) Int. Cl.
*H04N 7/01* (2006.01)
(52) U.S. Cl. ..................................................... 348/445
(58) Field of Classification Search .................. 348/500, 348/521, 525, 445, 555, 558, 725, 726
See application file for complete search history.

(56) References Cited

U.S. PATENT DOCUMENTS

| 5,917,552 | A | * | 6/1999 | Van Court ..................... 348/558 |
| 5,982,420 | A | * | 11/1999 | Ratz .............................. 348/171 |
| 7,750,976 | B2 | * | 7/2010 | Scott et al. .................... 348/558 |
| 2002/0168036 | A1 | | 11/2002 | Kim |
| 2004/0008286 | A1 | * | 1/2004 | Markman et al. ............. 348/725 |
| 2006/0164548 | A1 | | 7/2006 | Uno |

FOREIGN PATENT DOCUMENTS

| KR | 10-0268061 | 8/1998 |
| KR | 20-0318449 | 10/2004 |

OTHER PUBLICATIONS

Application Serial No. 07019966.6, Extended European Serach Report mailed Dec. 20, 2011, 9 pages.

* cited by examiner

*Primary Examiner* — Hunter B Lonsberry
*Assistant Examiner* — Aklil Tesfaye
(74) *Attorney, Agent, or Firm* — Brake Hughes Bellerman LLP

(57) ABSTRACT

In a method of automatically identifying a format of a video signal, where the video signal includes HSync pulses, VSync pulses, and video display data, the video signal is received, information about timing and width characteristics of the HSync pulses and the VSync pulses is extracted from the video signal, and the format of the video signal is determined based on the extracted information.

19 Claims, 16 Drawing Sheets

AUTOMATIC FORMAT IDENTIFICATION OF ANALOG VIDEO INPUT SIGNALS

CROSS-REFERENCE TO RELATED APPLICATIONS

This application claims priority under 35 U.S.C. §119(e) to U.S. Provisional application Ser. No. 60/854,759, filed on Oct. 27, 2006, entitled "Automatic Format Identification Of Analog Video Inputs (PC and ATSC)," which is hereby incorporated by reference.

TECHNICAL FIELD

This disclosure relates to video signal processing and, more particularly, to automatic format identification of analog video input signals.

BACKGROUND

Video images can be displayed in a variety of formats. Generally, successive still images (i.e., "frames") are displayed, and the images can be displayed at different rates (i.e., "frame rates") depending on the format. Each frame generally consists of multiple horizontal lines, and each line consists of multiple pixels. The number of lines in a frame and the number of pixels in a line can be different in different formats. A frame can be created by displaying each horizontal line successively (i.e., "progressive scanning") or can be created by first displaying each odd numbered line successively to create a first field and then displaying each even numbered line successively to create a second field (i.e., "interlaced scanning"). Of course, a device that captures the video signal (for processing or display) has to be configured for the specific format of the video signal that it receives as input. Knowing the frame frequency, line frequency and sample frequency are critical to (a) locking to the input signal and (b) generating an image with the proper resolution for each frame.

SUMMARY

The details of one or more implementations of systems and methods for automatically identifying the format of an analog input signal are set forth in the accompanying drawings and the description below. Other features will be apparent from the description and drawings, and from the claims.

DETAILED DESCRIPTION

An analog video signal, which can be provided, for example, by a wireless electromagnetic signal or by a wired transmission (e.g., from a video cassette recorder or from a processor in a personal computer) carries video display data that is to be converted into video images on a display device. The video signal also carries additional information that indicates to the display hardware when the display of one frame ends and when the next frame begins, and when the display of a line within a frame ends and when the next line of the frame begins. This information can be provided in the form of vertical synchronization ("VSync") pulses and horizontal synchronization ("HSync") pulses. The timing of the VSync and HSync pulses, and the width of the pulses can be different for different video formats, and, therefore, accurate detection of the timing and width characteristics of the VSync and HSync pulses of the video signal can be used to determine automatically the format of the video signal.

Figure 1:
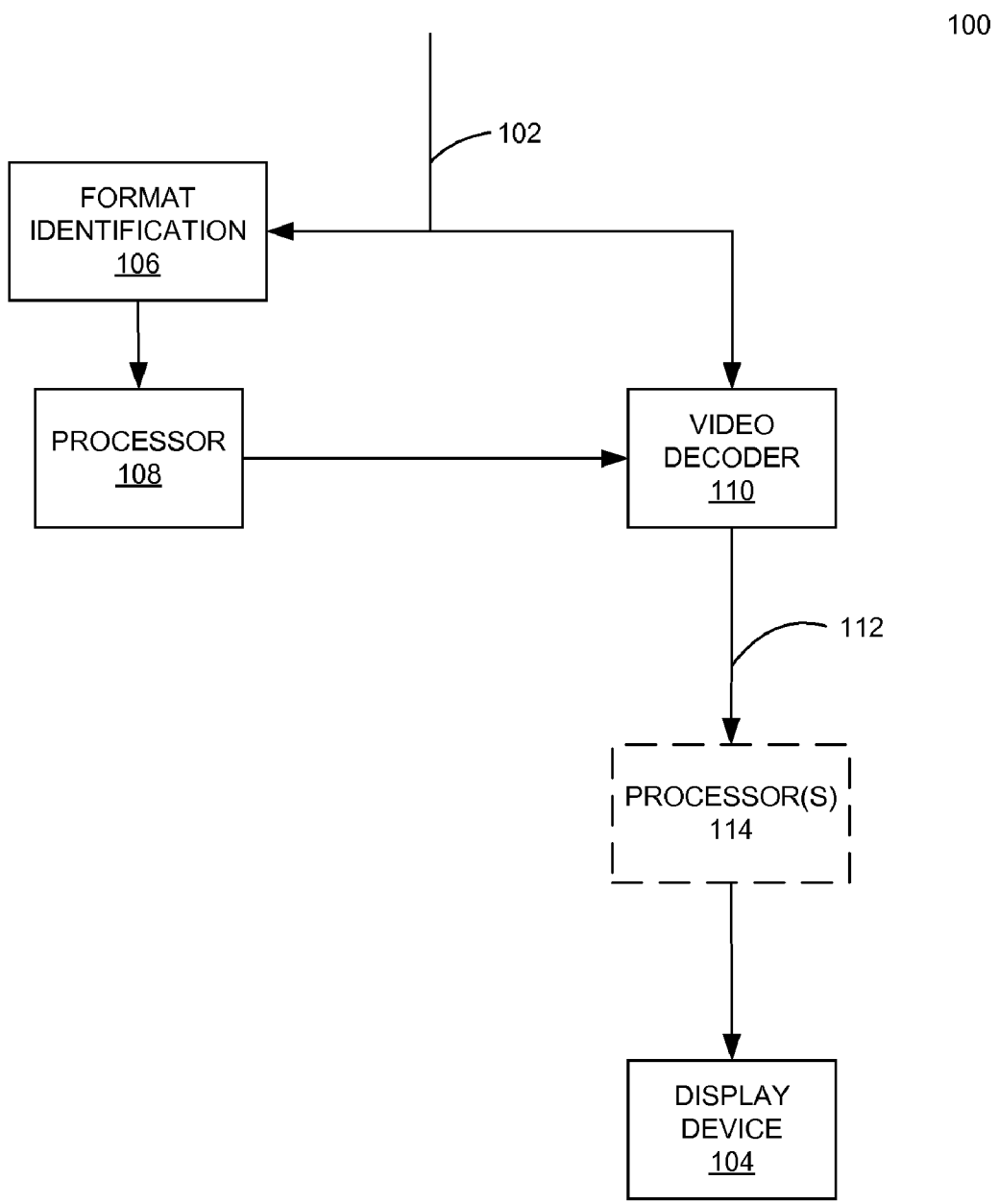
FIG. 1 is a block diagram of a system in which the format of an analog video input signal is automatically identified, and which outputs an output video signal to a display device in an output format based on the identified input format.

FIG. 1 is a block diagram of a system 100 in which the format of an analog video input signal 102 is automatically identified, and which outputs an output video signal to a display device 104 in an output format based on the identified input format. The input signal 102 is routed to a format identification block 106, which automatically identifies the input format and communicates the identified format to a processor 108. The processor 108 then configures a video decoder ("VDEC") 110 to process the input signal 102 and output an output signal 112 in a format compatible for display on the display device 104. The output signal 112 optionally can be additionally processed by one or more additional video processors 114.

Table 1 (below) shows 17 different Advanced Television Systems Committee ("ATSC") analog video formats and provides information about characteristics of each format. The first column of the table lists the name of the format. The second column lists the frame rate of the video output, where the frame rate is measured in clock cycles per second (Hz). Formats that use a frame rate of 60 Hz for progressive scanning or 30 Hz for interlaced scanning generally are suitable for use in the United States, while formats that use a frame rate of 50 Hz for progressive scanning or 25 Hz for interlaced scanning are suitable for use in Europe. The third column lists the value of the "pixel clock," i.e., the rate at which individual pixels are displayed, and is measured in MHz. The value of the pixel clock is equal to the product of the frame rate, the number of pixels per line (listed in the fourth column) and the number of lines per field (listed in the seventh column). The sixth column lists the line period, which is a measure of the time (measured in microseconds) required to display one line, and the ninth column lists the "line length," which is a measure of the number of 108 MHz clock cycles required to display one line. The fifth column lists the "sync time," which is a measure of the time occupied by an HSync pulse during the display of each line (generally at the beginning or end of the line), where the value is given in terms of the number of pixel clocks (column 3). The eighth column lists the "sync width," which is the "sync time" measured in constant unit of measurement: 108 MHz clock periods. Because at least one parameter independent of the Pixel clock distinguishes a given format in Table 1 from all other listed formats, measurement of the parameters given in Table 1 can be used to uniquely identify each of the 17 different ATSC video formats shown in Table 1.

Table 2 (below) shows 32 different analog video formats used for displaying video a personal computer ("PC") format and provides similar information as given in Table 1 about characteristics of each format. In addition, Table 2 presents two columns that list the polarities of the VSync and HSync pulses of the video signal. The different formats can be grouped based on the polarities of these Sync pulses. For example, PC formats in which both the VSync and HSync pulses are negative belong to Group 1; PC formats in which the polarity of VSync pulses is positive and the polarity of HSync pulses is negative belong to Group 2; PC formats in which the polarities of VSync pulses and HSync pulses both are positive belong to Group 3; and PC formats in which the polarity of VSync pulses is negative and the polarity of HSync pulses is positive belong to Group 4. Again, the different values of the parameters listed in Table 2 allow each PC format to be uniquely identified. In particular, the different formats listed in Tables 1 and 2 can be identified by whether they are ATSC or PC formats, the polarity values of the HSync and VSync pulses (for PC formats), the number of lines/field, the line length, whether the format is a progressive or interlaced format, and the Sync width of the HSync pulses used in the format.

TABLE 1

| Format | Frame Rate | Pixel Clock | Pixels/ Line | Sync Time | Line Period | Lines/ Field | Sync Width | Line Length | Prog/Int | H/V Polarity |
| --- | --- | --- | --- | --- | --- | --- | --- | --- | --- | --- |
| 1080p | 50 | 148.5 | 2376 | 66 | 16.000 | 1250 | 48 | 1728 | PROG | Not |
| 1080p | 50 | 148.5 | 2640 | 44 | 17.778 | 1125 | 32 | 1920 | PROG | Applicable |
| 1080p | 60 | 148.5 | 2200 | 44 | 14.815 | 1125 | 32 | 1600 | PROG | |
| 1080p | 30 | 74.25 | 2200 | 44 | 29.630 | 1125 | 64 | 3200 | PROG | |
| 1080p | 25 | 74.25 | 2640 | 44 | 35.556 | 1125 | 64 | 3840 | PROG | |
| 1080p | 24 | 74.25 | 2750 | 44 | 37.037 | 1125 | 64 | 4000 | PROG | |
| 720p | 50 | 74.25 | 1980 | 40 | 26.667 | 750 | 58 | 2880 | PROG | |
| 720p | 60 | 74.25 | 1650 | 40 | 22.222 | 750 | 58 | 2400 | PROG | |
| 1080i | 25 | 74.25 | 2376 | 66 | 32.000 | 625 | 96 | 3456 | INT | |
| 576p | 50 | 27 | 864 | 63 | 32.000 | 625 | 252 | 3456 | PROG | |
| 1080i | 25 | 74.25 | 2640 | 44 | 35.556 | 562/563 | 64 | 3840 | INT | |
| 1080i | 30 | 74.25 | 2200 | 44 | 29.630 | 562/563 | 64 | 3200 | INT | |
| 480p | 60 | 27 | 858 | 63 | 31.778 | 525 | 252 | 3432 | PROG | |
| 576i | 25 | 13.5 | 864 | 63 | 64.000 | 312/313 | 504 | 6912 | INT | |
| 288p | 25 | 13.5 | 864 | 63 | 64.000 | 313 | 504 | 6912 | PROG | |
| 480i | 30 | 13.5 | 858 | 63 | 63.556 | 262/263 | 504 | 6864 | INT | |
| 240p | 60 | 13.5 | 858 | 63 | 63.556 | 263 | 504 | 6864 | PROG | |

TABLE 2

| Group | Format | Frame rate | Pixel clock | Pixels/ line | Sync Time | Line period | Lines/ Field | Sync Width | Line Length | V Polarity | H Polarity |
| --- | --- | --- | --- | --- | --- | --- | --- | --- | --- | --- | --- |
| 1 | 1024 × 768 | 70 | 75 | 1328 | 136 | 17.707 | 806 | 195 | 1912 | NEG | NEG |
| | 1024 × 768 | 60 | 65 | 1344 | 136 | 20.677 | 806 | 225 | 2233 | NEG | NEG |
| | 640 × 480 | 60 | 25.175 | 800 | 96 | 31.778 | 525 | 411 | 3431 | NEG | NEG |
| | 640 × 480 | 72 | 31.5 | 832 | 40 | 26.413 | 520 | 137 | 2852 | NEG | NEG |
| | 640 × 480 | 85 | 36 | 832 | 56 | 23.111 | 509 | 168 | 2496 | NEG | NEG |
| | 640 × 480 | 75 | 31.5 | 840 | 64 | 26.667 | 500 | 219 | 2880 | NEG | NEG |
| 2 | 1400 × 1050 | 75 | 156 | 1895 | 144 | 12.150 | 1097 | 99 | 1312 | POS | NEG |
| | 1400 × 1050 | 60 | 121.75 | 1864 | 144 | 15.314 | 1088 | 127 | 1653 | POS | NEG |
| | 1280 × 768 | 85 | 117.5 | 1712 | 136 | 14.577 | 807 | 124 | 1574 | POS | NEG |
| | 1280 × 768 | 75 | 102.25 | 1695 | 128 | 16.583 | 804 | 135 | 1791 | POS | NEG |
| | 1280 × 768 | 60 | 79.5 | 1663 | 128 | 20.92 | 796 | 173 | 2259 | POS | NEG |
| | 720 × 400 | 85 | 35.5 | 936 | 72 | 26.366 | 446 | 219 | 2847 | POS | NEG |
| | 640 × 400 | 85 | 31.5 | 832 | 64 | 26.413 | 445 | 219 | 2852 | POS | NEG |
| 3 | 1600 × 1200 | 60 | 162 | 2160 | 192 | 13.333 | 1250 | 102 | 1440 | POS | POS |
| | 1280 × 1024 | 85 | 157.5 | 1728 | 160 | 10.971 | 1072 | 109 | 1184 | POS | POS |
| | 1280 × 1024 | 75 | 135 | 1688 | 144 | 12.504 | 1066 | 115 | 1350 | POS | POS |
| | 1280 × 1024 | 60 | 108 | 1688 | 112 | 15.630 | 1066 | 112 | 1688 | POS | POS |
| | 1280 × 960 | 85 | 148.5 | 1728 | 160 | 11.636 | 1011 | 116 | 1256 | POS | POS |
| | 1280 × 960 | 60 | 108 | 1800 | 112 | 16.667 | 1000 | 112 | 1800 | POS | POS |
| | 1152 × 864 | 75 | 108 | 1600 | 128 | 14.815 | 900 | 128 | 1600 | POS | POS |

TABLE 2-continued

| Group | Format | Frame rate | Pixel clock | Pixels/line | Sync Time | Line period | Lines/Field | Sync Width | Line Length | V Polarity | H Polarity |
|---|---|---|---|---|---|---|---|---|---|---|---|
| | 1024 × 768 | 85 | 94.5 | 1376 | 96 | 14.561 | 808 | 109 | 1572 | POS | POS |
| | 1024 × 768 | 75 | 78.75 | 1312 | 96 | 16.667 | 800 | 131 | 1800 | POS | POS |
| | 1360 × 768 | 60 | 85.5 | 1792 | 112 | 20.964 | 795 | 141 | 2264 | POS | POS |
| | 800 × 600 | 72 | 50 | 1040 | 120 | 20.800 | 666 | 259 | 2246 | POS | POS |
| | 800 × 600 | 85 | 56.25 | 1048 | 64 | 18.631 | 631 | 122 | 2012 | POS | POS |
| | 800 × 600 | 60 | 40 | 1056 | 128 | 26.400 | 628 | 345 | 2851 | POS | POS |
| | 800 × 600 | 75 | 49.5 | 1056 | 80 | 21.333 | 625 | 174 | 2304 | POS | POS |
| | 800 × 600 | 56 | 36 | 1024 | 72 | 28.444 | 625 | 216 | 3072 | POS | POS |
| | 640 × 350 | 85 | 31.5 | 832 | 64 | 26.413 | 445 | 219 | 2852 | POS | POS |
| | 1024 × 768i | 43 | 44.9 | 1264 | 176 | 28.151 | 408/409 | 423 | 3040 | POS | POS |
| 4 | 1400 × 1050 | 60 | 101.0 | 1561 | 32 | 15.456 | 1078 | 34 | 1669 | NEG | POS |
| | 1280 × 768 | 60 | 68.25 | 1440 | 32 | 21.097 | 790 | 50 | 2278 | NEG | POS |

Figure 2:
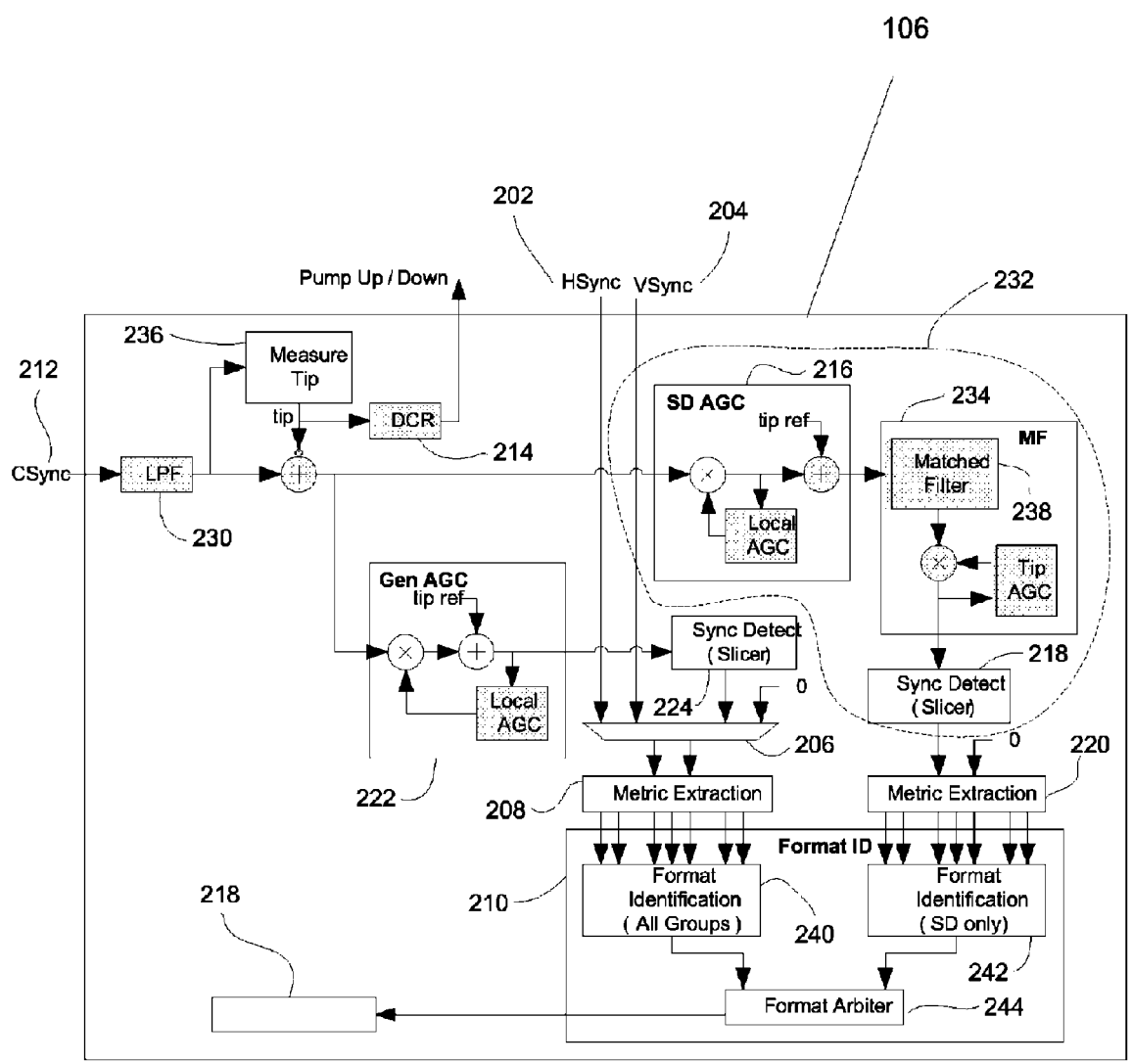
FIG. 2 is a schematic block diagram of the format identification module for automatically identifying the format of an analog video input signal.

FIG. 2 is a detailed schematic block diagram of the format identification block 106 for automatically identifying the format of an analog video input signal. The block 106 is configured to identify the video signal format based on information extracted from the HSync and VSync signals of the input video signal when the signal is sampled at the system clock. The input video signals input into the block 106 can exist in a number of different formats. If the input signal is in a PC format, then the information about the images for display, information about the HSync pulses, and information about VSync pulses is input on different wires. In this case, it is relatively straightforward to extract the relevant information about the HSync and VSync pulses. The HSync signal 202 and the VSync signal 204 can be routed through a multiplexer 206 to a metric extraction block 208 that extracts relevant information about the VSync and HSync pulse that can be used to characterize the format of the input signal. After these metrics are extracted, they are input in a format ID block 210 in which the input format is determined based on the extracted metrics.

However, the input signal also can be a composite sync (CSync) signal, in which the video display data, the HSync pulses, and the VSync pulses are all embedded in a single signal (e.g., as commonly found in ATSC formats). Distinguishing the different sync types and their timing on a CSync signal is more challenging than when using the dedicated Hsync and VSync signals associated with PC formats. Csyncs signals (i.e., signals that include video display data, HSync pulses, and VSync pulses) can be used with either component video signals or composite video signals, where a component signal refers to a signal that includes one color of video display data and a composite signal refers to a signal that includes information encoding three color spaces of video display data. A composite sync (CSync) signal thus refers to the merger of the HSync data, VSync data, and some form of video display data, but a CSync signal can be used with either a component (i.e., one color) video signal or a composite (i.e., three color) video signal. The format identification 106 block behaves in a similar manner for both component and composite signals.

To extract this information for a relatively high noise CSync signal (e.g., a standard definition ("SD") signal), the format identification block 106 can mimic the functionality of the VDEC front end to identify and characterize HSync and Sync pulses embedded in the CSync signal. For example, the block 106 can normalize an offset of the input signal with a DC restore ("DCR") block 214, can normalize a gain of the signal with an automatic gain control ("AGC") block, and can lock to the HSync component of the CSync signal by using a matched filter to perform a quasi-PLL locking to the signal. For a high-noise CSync signal, an SD-AGC block 216 can be used to normalize the gain of the signal prior to routing the normalized signal to the matched filter. Then, HSync and VSync pulses can be detected by passing the normalized and filtered signal though a threshold detector (also known as a "Slicer") 218. Once the Sync pulses are detected, metrics about the Sync pulses are extracted in a metric extraction block 220, and the format of the input signal can be determined in the format ID block 210 based on the extracted metrics.

However, to extract relevant information from a relatively low noise CSync signal, after normalizing the offset of the signal in the DCR block, the signal can be routed to a Gen-AGC block 222 that normalizes the gain of the low noise signal, prior to passing the normalized signal to a slicer 224 that identifies the Sync pulses. Once the Sync pulses are detected, metrics about the Sync pulses can be extracted in the metric extraction block 208, and the format of the input signal can be determined in the format ID block 210 based on the extracted metrics.

Because it is difficult to determine a priori whether the CSync signal 212 is a high- or low-noise signal, and because the noise level of a signal can change, the CSync signal is routed though both the high-noise path that includes the SD-AGC block 216 and through the low-noise path that includes the Gen-AGC block 222, and a format is identified based on the analysis performed in each path. Finally, a format arbiter 226 arbitrates between the formats identified by the two paths. The resulting format is output to a register 228 where it is available to the video signal processing software.

Figure 3:
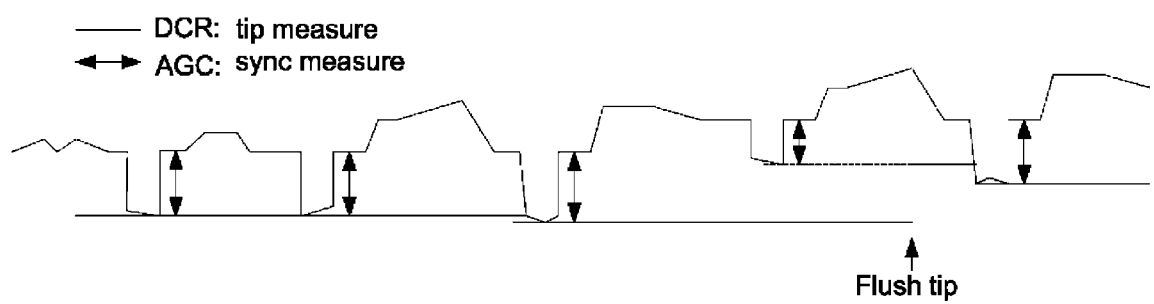
FIG. 3 is a schematic graph of an input signal that include Sync pulses (shown as periodic negative polarity pulses within the input signal) that have an amplitude and a width.

In order to extract information about the HSync and VSync pulses that characterize a CSync input signal 212, it is necessary to identify the Sync pulses that are embedded within the input signal. For example, as shown in FIG. 3, an input signal can include Sync pulses, which are shown as periodic negative polarity pulses within the input signal, that have an amplitude and a width. The amplitude of the Sync pulses is defined as the amplitude between a baseline "blank" level and a maximum negative "tip" level. Between the Sync pulses the input signal contains video display data that is output to the display device 104. The amplitude and the tip level of Sync pulses in an input video signal may not be normalized, and therefore it can be useful to normalize the tip level through the DCR circuitry 214 and to normalize the blank level through AGC circuitry 216 and/or 222 prior to extracting HSync and VSync metrics from the signal. For example, in one implementation, when the analog input signal is sampled at a clock rate of 108 MHz and the amplitude of the signal is digitized into 256 levels, the tip level may be normalized to an amplitude of about 16 units, and the blank level may be normalized to a level of about 240 units.

Figure 4:
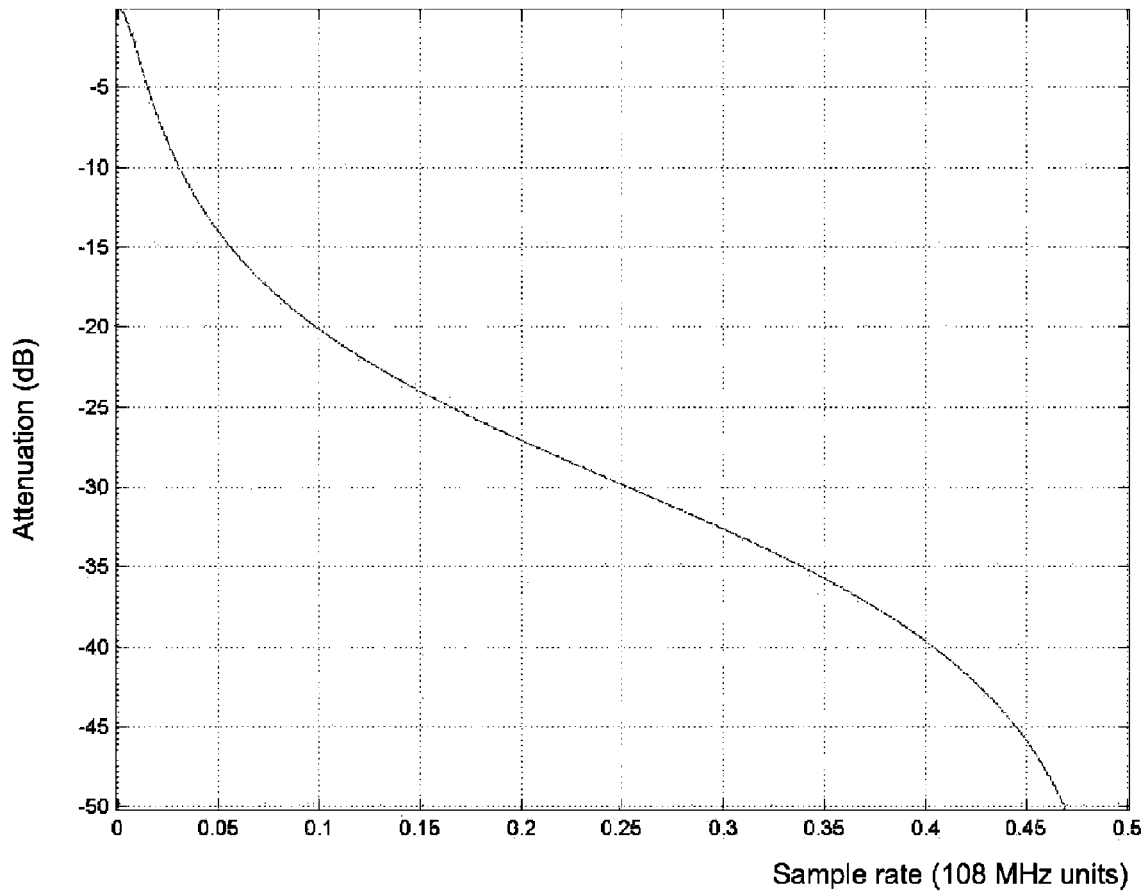
FIG. 4 is a schematic graph of a frequency response of an example implementation of a low pass filter for filtering an input signal.

Referring again to FIG. 2, when a CSync signal is input into the format identification block 106, the signal can be routed to a low pass filter ("LPF") 230, which is used to clean up the analog CSync input. The LPF 230 can be an infinite impulse response ("IIR") filter with fixed coefficients. The frequency response of one example implementation of an LPF is plotted in FIG. 4, where the x-axis is measured in terms of the 108 MHz sample rate, and the attenuation on the y-axis is measured in terms of dB.

After being passed through the LPF 230, the tip level of the CSync signal is measured in the tip measuring circuitry 232, and DCR circuitry 214 is used to normalize the bias level of the CSync signal, as shown in the upper left of FIG. 2. As described in more detail below, the DCR circuitry 214 outputs an analog error signal, or a "pump up/down" signal that is fed back to the analog version of the input CSync signal 212 to drive the baseline of the input signal to a desired value while the format identification block 106 identifies the format of the CSync signal. To extract information about the Sync pulses from the CSync signal 212, the format identification block 106 aligns the input signal (i.e., sets the bias level) so that the tip level is slightly above zero. However, referring again to FIG. 1, after the format of the input signal has been determined, when the VDEC 110 decodes the signal, the VDEC 110 aligns the signal so that the blank level is at a desired value, so that it has maximum resolution of the video display data that exists between the Sync pulses, but which may result in the tip value not being placed slightly above zero. Therefore, the processor 108 can configure the system 100 such that format identification block 106 controls the DCR value of the input signal until the signal format has been identified, and once the format has been identified, control of the DCR value can be assigned to the VDEC 110.

During format identification, the format identification block 106 identifies the tip level, which can be done without knowing the input format because the tip value provides a local minimum of the signal. To mitigate the impact of noise when identifying the tip value, the CSync signal can be passed through the LPF 230, as described above, the filter output can be run through a 32-sample running averager, and the locally measured minimum can be flushed after a programmable delay (e.g., about 32 k samples).

The tip value of the input signal can be determined by comparing the local minimum of the signal with the output of the averager. The local minimum can be reset in a stable manner to track any drifts in tip level of the signal. The resulting tip then can be used to adjust the DCR value and subtracted from the input CSync signal 212. This subtraction biases the signal around the determined tip value independent of whether the VDEC 110 or the format identification block 106 is controlling the DCR value.

Figure 5:
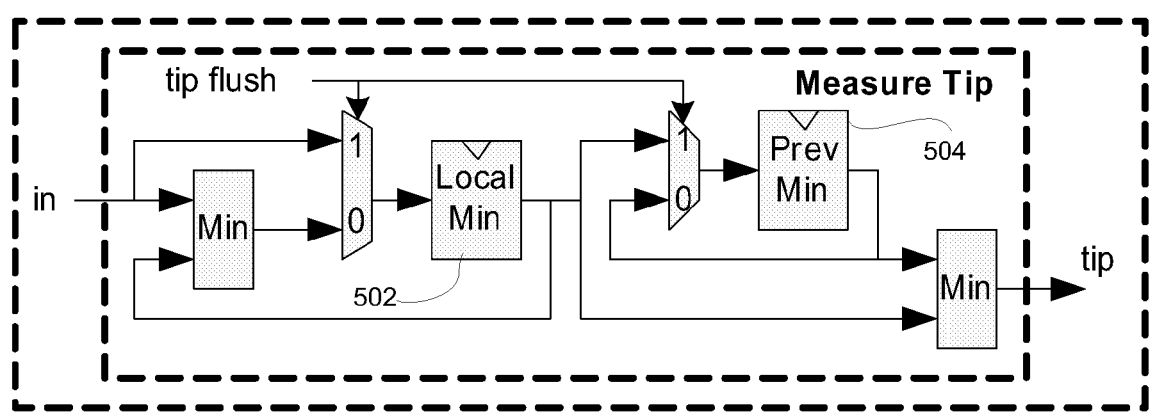
FIG. 5 is a schematic block diagram of a circuit for measuring a tip value of an input signal while allowing resetting the minimum value without any temporary spikes.

In one implementation, as shown in FIG. 5, the tip value can be measured using two stages of flops, local_min 502 and prev_min 504, to allow resetting the minimum value without any temporary spikes. The signal output from the local_min flop 502 can track the minimum value of the input samples. After each programmable delay period elapses, (e.g., every 32 k samples), the system can move the output of the local_min flop 502 to the prev_min flop 504 and overwrite the local_min value with the value of the most recent sample. This tip value "flushing" means that tip value is updated every n lines, where n is format dependent, but always greater than 1.

Figure 6:
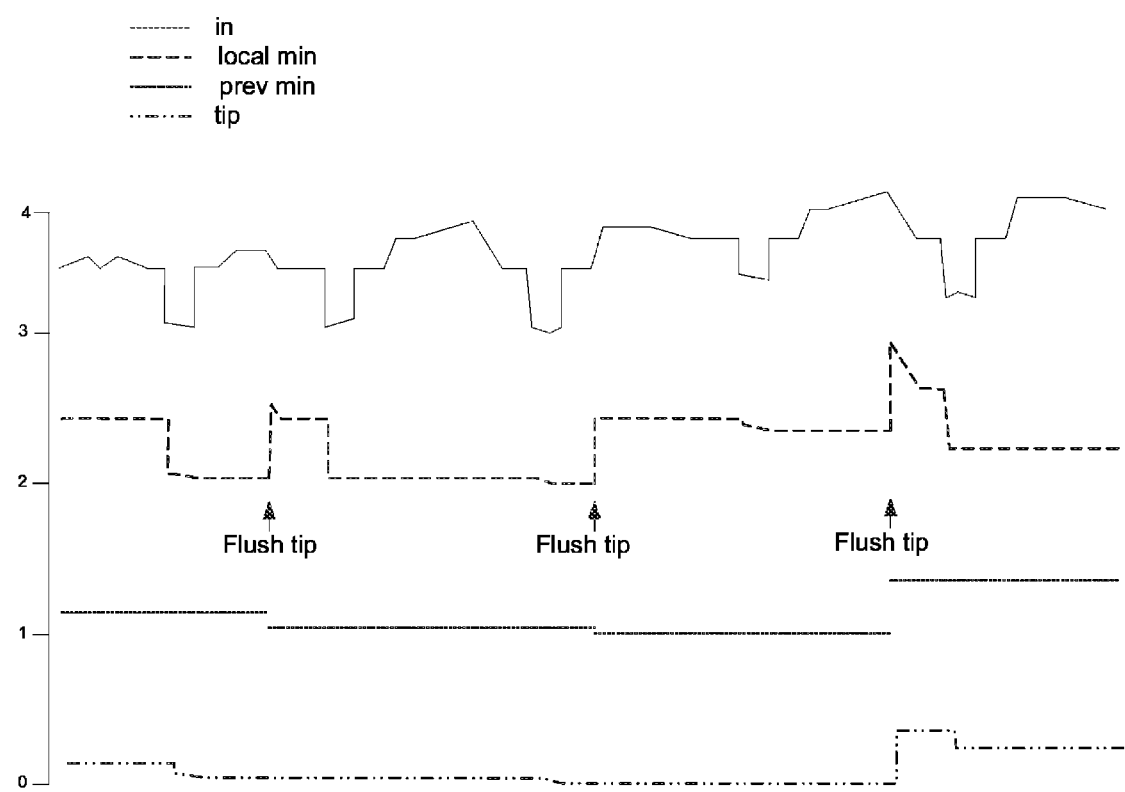
FIG. 6 is a schematic graph of showing two-stage flushing of a tip value of an input signal.

Thus, FIG. 6 illustrates the effect of this two-stage flushing in this simplified example. In FIG. 6, the input signal is shown in a solid line, the value output from the local_min flop is shown in dashed line, and the output of the prev_min flop is shown in a dotted line. The dashed, double-dotted line shows the minimum value that is output in response to the input and the flush_tip commands. For clarity, the lines are offset vertically from each other. In particular, the input signal (solid line) is offset vertically by three units. The value of the local_min flop (dashed line) is offset vertically by two units. The value of the prev_min flop (dashed, double-dotted line) is offset vertically by one unit.

The local_min value is set to the instantaneous value of the input signal every time the tip is flushed and then settles back to the actual tip value of the input signal. The settling of the local_min value is suppressed from the minimum value that is output (the dashed, double-dotted line line) since the minimum value that is output is always the lesser of the local_min value and the prev_min value. The prev_min value provides a stable default value since it has already settled. Note that the prev_min value can overly bias the tip value as in the case between the second and third flush_tip arrows. This either helps eliminate the impact of noise or forces prev_min to lag behind a general upwards trend in the tip value. In either case, the impact persists only until the next flush_tip pulse. It should be noted that FIG. 6 is a schematic drawing, and, in practice, the flush_tips can be spread over more than several tip values than is shown in FIG. 6.

Figure 7:
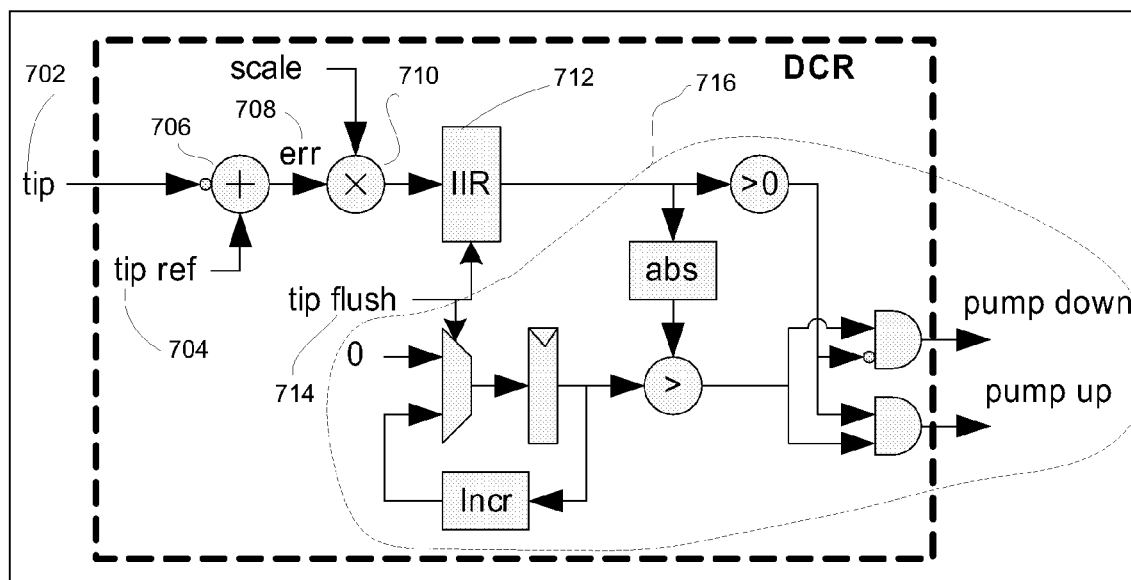
FIG. 7 is a schematic block diagram of the DC restore block for restoring the DC value of an input signal.

The DCR block in the upper left corner of FIG. 2, can receive the tip value and generate a pump up/pump down signal to normalize the bias of the input signal. FIG. 7 is a detailed block diagram of the DCR block. As shown in FIG. 7, the measured tip value 702 is received and compared to a reference value 704, and the difference between the tip value and the tip ref value is compared in a comparator 706 that outputs an error signal 708 that is scaled in a scaler 710, the output of which is submitted to an IIR filter 712 once every "tip flush" period (e.g., using the same control signal 714 used by the Measure Tip block shown in FIG. 5). The IIR filter 712 smooths the feedback signal that drives the tip value to equal the tip ref value. A pulse width modulator ("PWM") 716 can generate a pump up pulse or a pump down pulse depending on the sign of the error signal output from the IIR filter 712, and the duration of the pump up/down pulse is defined by the magnitude of the signal output form the IIR filter 712. The pump up signal or the pump down signal then is output from the DCR block 214 and fed back to the analog input of the CSync input signal to drive the bias level of the input signal to a level such that the measured tip value equals the tip ref value.

Figure 8:
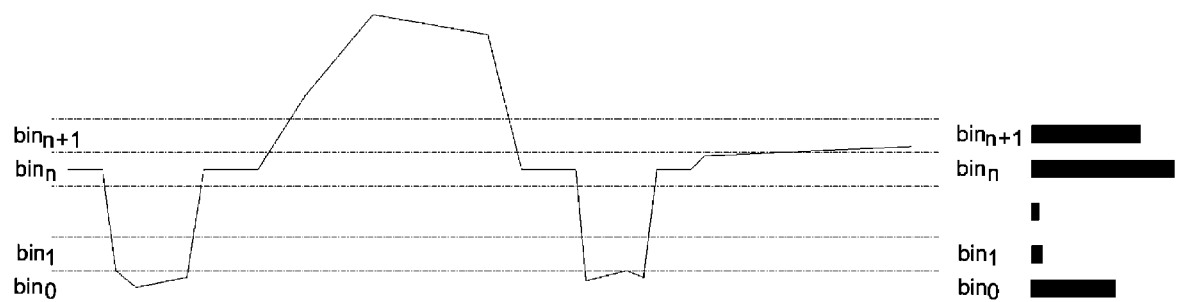
FIG. 8 is a schematic graph illustrating how blank and tip sync levels can be measured by partitioning the lower value range of an input signal into a series of bins and then noting how often the signal is in each of the bins.

The tip-normalized signal is then passed to the Gen AGC 222 block and the SD AGC 216 block shown in FIG. 2, where the gain is normalized to ensure that the amplitude between the tip level and the blank level is standardized. As shown in FIG. 8, The Format ID block can measure the sync level by partitioning the lower value range into a series of bins and then determining how often the signal is in each of the bins. The bin distribution can be used to identify the tip level and the blank level. The AGC blocks 222 and 216 can be used to scale the signal to achieve the defined bin spread. FIG. 8 depicts an example waveform superimposed over the bin ranges. On the right side is a plot of the distribution of samples that fall within each bin.

Figure 9:
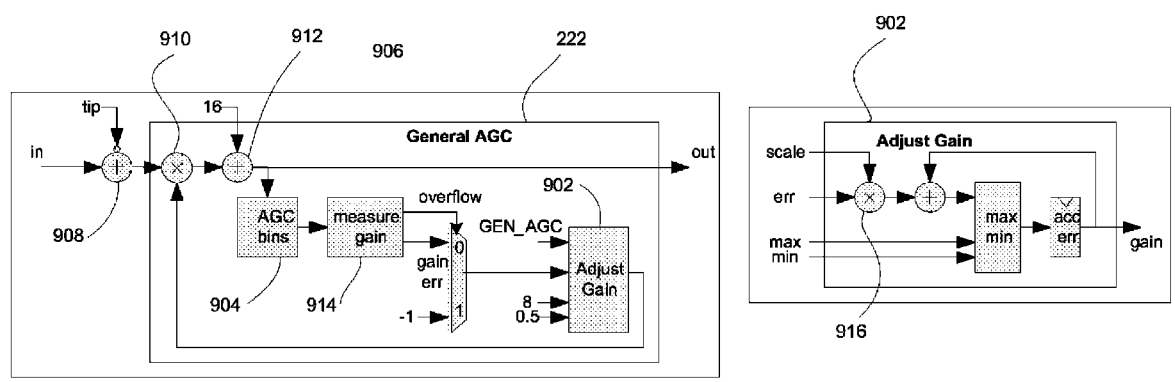
FIG. 9 is a schematic block diagram of a "General Automatic Gain Control" circuit and an "Adjust Gain" circuit for aligning the blank level to a pre-specified value range by maintaining the bin counts, identifying the number of bins between a tip level and a blank level of an input signal, and adjusting the input to position the blank level to match the desired performance.

FIG. 9 is a block diagram of a "Gen AGC" block 222 and an "Adjust Gain" block 902 that can be used to maintain the bin counts and that can be used to identify the number of bins between the tip and blank levels, a described above with respect to FIG. 8. The General AGC block 222 is broken into three stages. The first stage 904 receives a current input signal 906 that has had its bias level adjusted to be 16 units above zero by a bias leveling circuit 908, a multiplier 910, and a bias offset circuit 912. The second stage 914 evaluates the bins in which the input signal 906 lies to determine the current blank level and compute an error signal that is output to a third stage 902 that accumulates and clamps the error signal to scale the input signal. The third stage 902 can receive the error signal and multiply it by a scaling signal in a multiplier 916.

The "Gen AGC" block 222 and the "Adjust Gain" block 902 can derive the proper gain to appropriately scale the input signal using the statistics of the analog signal, by "binning" the amplitude of the CSync signal into a number of discrete bins, "NUM_OF_SBINS" (e.g., chosen to be 12). Each bin (e.g., "bin_acc[j]") can accumulate input CSync amplitude levels within a given minimum and maximum levels, where the maximum level minus the minimum level can be pre-defined by a parameter, "SBIN_WIDTH," (e.g., nominally chosen to be 32 units). An algorithm for accumulating CSync signal amplitude levels can be described by the following pseudo code:

```
PRE-DEFINED_WINDOW    = (nominally)  32678   (32K)
PRE-DEFINED_THRESHOLD = (nominally)  32678   (32K)
DELTA_AGC             = (nominally)  0.002   (~2⁻⁹)
BLANK_THRESHOLD       = (nominally)  2000    (2K)
for (j=0; j < NUM_OF_SBINS; j++)
{                              // Assign filtered input into
appropriate bin
  if (j < NUM_OF_SBINS-1)
  {
      if ((state_mc_input >= tip_out + (j*SBIN_WIDTH)) &&
(state_mc_input < tip_out +
          ((j+1)*SBIN_WIDTH))) ++bin_acc[j];
  }
  else   // The last bin accumulates all values beyond
1023-SBIN_WIDTH
  {
      if (state_mc_input >= 1023-SBIN_WIDTH)
++bin_acc[NUM_OF_SBINS-1];
  }
}
                              // Next:
```

Then, the smallest bin index (i.e., "first_nzero_index") having the non-zero value and the bin index (i.e., "max_index") containing the maximum value can be obtained. Thereafter, the bin index (i.e., "blank_index") containing the blank level can be obtained according to the instructions of the following pseudo-code:

```
// To get the index corresponding to the blank level
for (j=1; ( (j < NUM_OF_SBINS) && ((bin_acc_out[j] <
BLANK_THRESHOLD) || (bin_acc_out[j] <
0.5*bin_acc_out[first_nzero_index])) ); j++);
  blank_index = j+1;
```

The bins can be normalized, if necessary, according to instructions given by the following pseudo-code:

```
if (bin_acc[max_index] >= PRE_DEFINED_THRESHOLD)
{
  for (j=0; j < NUM_OF_SBINS; j++)
  {            // Halve the bin accumulators
    bin_acc[j] = bin_acc[j]/2;
  }
}
```

If an end of an accumulator window is reached, then the current values of each of the bins can be buffered.

With this scaling, an appropriate tip can be defined to be at a level of 16 units and an appropriate blanking level can be defined to be at a level of 240 units. Thus, all the tips may be accumulated in bin_acc[0] and all the blanking levels may be accumulated in bin_acc[7], assuming SBIN_WIDTH=32. This condition yields a simple way to determine the value of "agc_gain," as expressed by the following pseudo-code:

```
if (sample_count % PRE-DEFINED_WINDOW == 0)
{              // Next, update the bin accumulator output
buffers
  for (j=0; j < NUM_OF_SBINS; j++)
  {
    bin_acc_out[j] = bin_acc[j];
  }
             // Finally, compute the AGC scale
  if (bin_acc_out[NUM_OF_SBINS-1] <
(bin_acc_out[0]+bin_acc_out[1]+
    bin_acc_out[2]))
    agc_gain = agc_gain + DELTA_AGC*(7.0 - (blank_index-
first_nzero_index));
  else
    agc_gain = agc_gain - DELTA_AGC;
}
```

Thus, at "steady state," the value of first_nzero_index, which accumulates the tip levels, should be 0, and the value of blank_index, which accumulates the blanking level, should be 7. Using the bin concept, these techniques can be extended to compute the coarse DCR value that is used to set the bias of the signal, as described above. The DCR value can be accumulated in a register called dcr_offset by setting dcr_offset=dcr_offset+(average (tip)−16)*DELTA_DCR, where, DELTA_DCR is nominally chosen to be equal to 0.0004 (i.e., about $1.6*2^{-12}$).

A local AGC loop can be used to regulate the amplitude of the sampled CSync signal before it is analyzed to identify the format of the signal. To set up the loop, a histogram of the incoming CSync samples can be calculated, and all the incoming signal samples can be sorted into a predefined number of levels (or bins). Next, the desired AGC condition can be the one in which the tip level is close to zero (e.g., around 16 units) and the blanking level is close to the maximum (e.g., around 240 units when the maximum signal level is 256 units). For example, if the incoming samples is sorted into 12 bins (bin_acc[0] to bin_acc[11]) with each bin being 32 units wide, then all the tip values can be accumulated in bin_acc[0], which accumulates all samples having a level between [0, 31]. Likewise, all the blanking levels can be accumulated in bin_acc[7], which accumulates all samples between [224, 255]. Then, the bin that contains the tip values can be identified as the first bin that includes non-zero contents, and its index value can be assigned to the first_nzero_index variable. Eventually at steady state, the first_nzero_index should be equal to 0 as a result of adjustment by the DCR block.

Then, the bin that contains the blanking level can be identified according to the following rule:

```
if (bin_acc[j] > BLANK_THRESHOLD
  and
     if (bin_acc[j] >
     0.5*bin_acc[first_nzero_index]),
     then the index value of corresponding bin "j" is
     assigned as the blank_index.
```

Eventually at steady state, the value of blank_index will be equal to the BLANK_LEVEL variable.

The BLANK_THRESHOLD variable can define the minimal number of samples of the incoming signal that correspond to the blanking level. In the case of National Television System Committee ("NTSC") formatted signals this value is no less than the combined length of the "front porch" and the "back porch" per line. The "front porch" section of the signal dedicated to a line is a brief (e.g., about 1.5 microsecond) period inserted between the end of each transmitted line of video data and the leading edge of the next HSync pulse. Its purpose is to allow voltage levels to stabilize in older televisions, preventing interference between picture lines. The "back porch" section of the line refers to the portion in each scan line between the end (rising edge) of the HSync pulse and the start of active video data. The back porch was originally allocated to allow the slow electronics in early televisions time to respond to the sync pulse and prepare for the active line period. Thus, in the case of NTSC signals the BLANK_THRESHOLD will be equal to about 6.5 microseconds or about 702 samples of a 108 MHz sample clock multiplied by the number of lines over which the accumulation takes place (defined by the ACC_WINDOW setting).

With these two bins identified, the AGC loop can be controlled as follows: agc_gain=agc_gain+DELTA_AGC*(BLANK_LEVEL−(blank_index−first_nzero_index)), where DELTA_AGC is a pre-defined scalar loop gain. To ensure that there are no bin overflows, the bins can be normalized periodically.

Registers uto control AGC functionality can be defined according to the fields described in Table 3 below.

This SD-specific AGC module 232 assumes that the CSync input has an HSync width that is associated with an SD signal. For example, as shown in Table 1, each SD format, but no other format, has an HSync width of 504 clock cycles. If this assumption is wrong, then the signal should be processed by the General AGC path that flows though the Gen AGC block 222. However, if the assumption is correct then a more accurate measure and scaling of the blank level may be achieved by using the SD-specific AGC module 232 because the matched filter can lock onto the information in the HSync pulses and reject the signal between the HSync pulses.

Figure 10:
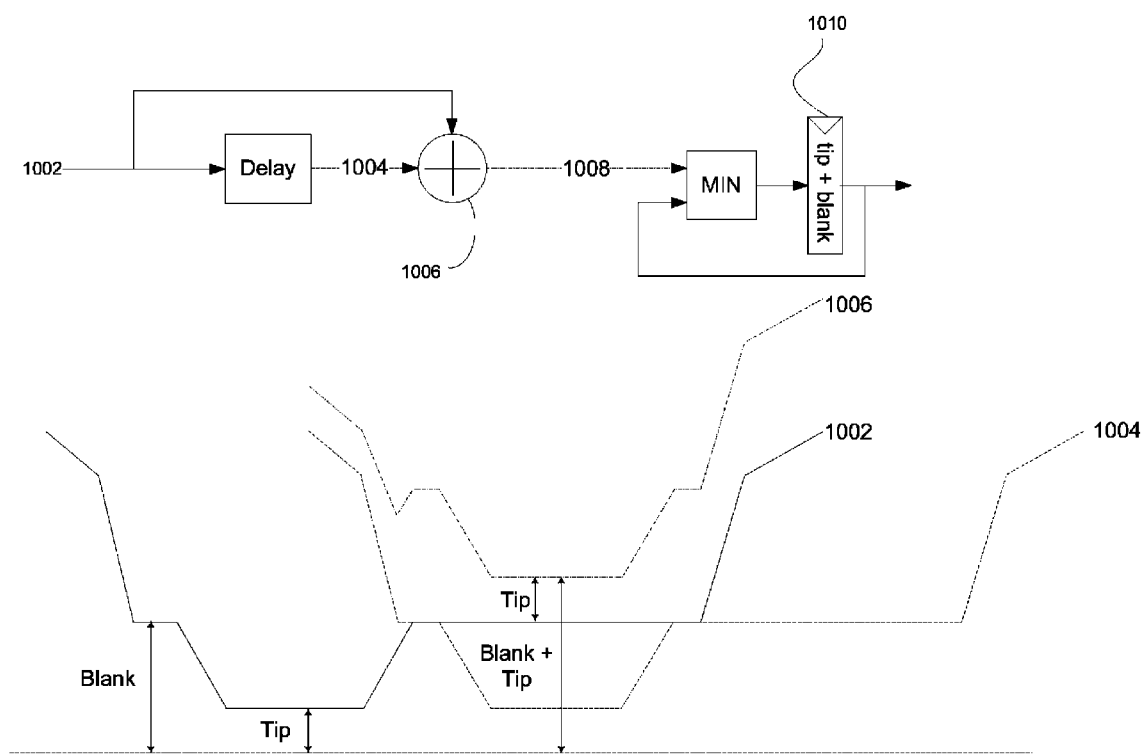
FIG. 10 is a schematic diagram of an input signal that is delayed by a delay block and summed with itself to produce a combined signal.

The SD AGC block 216 can be configured to exploit the known limits for the HSync width and fly back region to overlap the HSync tip with the blank levels by delaying the signal and adding it with itself, as shown in FIG. 10. In FIG. 10, an input signal 1002 can be delayed by a delay block to produce a delayed signal 1004 that is summed in a summing circuit 1006 with the input signal 1002 to produce the combined signal 1008. The minimum value of the resulting combination signal waveform 1008 occurs when the tip level of the delayed signal 1004 overlaps with the blank level of the undelayed input signal 1002 and can be output from a register 1010. Since the tip value can be determined by the "Measure Tip" block 236 of FIG. 2, as described above in more detail with respect to FIGS. 5-7, the blank value can be deduced by simply subtracting the known tip level from the minimum of the combined signal 1008 and then compared to a desired reference blank value. Then, the gain can be adjusted to normalize the blank level to equal the desired reference blank level.

TABLE 3

| Field Name | Field Description | Field Assignment |
|---|---|---|
| NUM_OF_BINS[3:0] | The number of levels or "bins" into which the sampled ATSC signal is divided for statistics collection. | Recommended value 12. |
| SBIN_WIDTH[5:0] | Defines the width of each bin | Recommended value 32. Thus, if the ATSC input sample is between [0, 31] it falls in bin 0, else if it is between [32, 63] it falls in bin 1 and so on . . . |
| ACC_WINDOW[6:0] | Defines the window size over which the continuously monitored bin statistics are normalized | Recommended value 32,678 (32K). The window size is calculated utilizing the following equation: ACC_WINDOW*1,024 |
| BLANK_THRESHOLD[12:0] | Defines the threshold value used to identify the bin containing the blank level | Recommended value 2,000 |
| AGC_GAIN[3:0] | Governs the gain of the AGC loop. Actual gain = AGC_GAIN*$2^{-11}$ | Recommended value 4 (Note: value 0 will disable the AGC loop) |
| BLANK_LEVEL[3:0] | Defines the target bin index corresponding to the blank level. | Recommended value 7. |

While the general AGC algorithms and techniques described above with respect to FIGS. 8 and 9 are sufficient for relatively clean and low-noise signals, they can be fooled by signals having significant noise or distortions and that are often associated with standard definition ("SD") signals, e.g., the formats 576i, 288i, 480i, and 240i listed in Table 1.

Therefore, in addition to being routed to the Gen AGC block 222 shown in FIG. 2, the tip-normalized CSync signal also can be routed to a SD-specific AGC module 232 that includes the SD AGC block 216 and the Matched Filter block 234 shown in FIG. 2. The SD-specific AGC module 232 can be used to condition a high-noise input CSync signal prior to analysis of the signal to extract the parameters used to identify a signal format.

Figure 11:
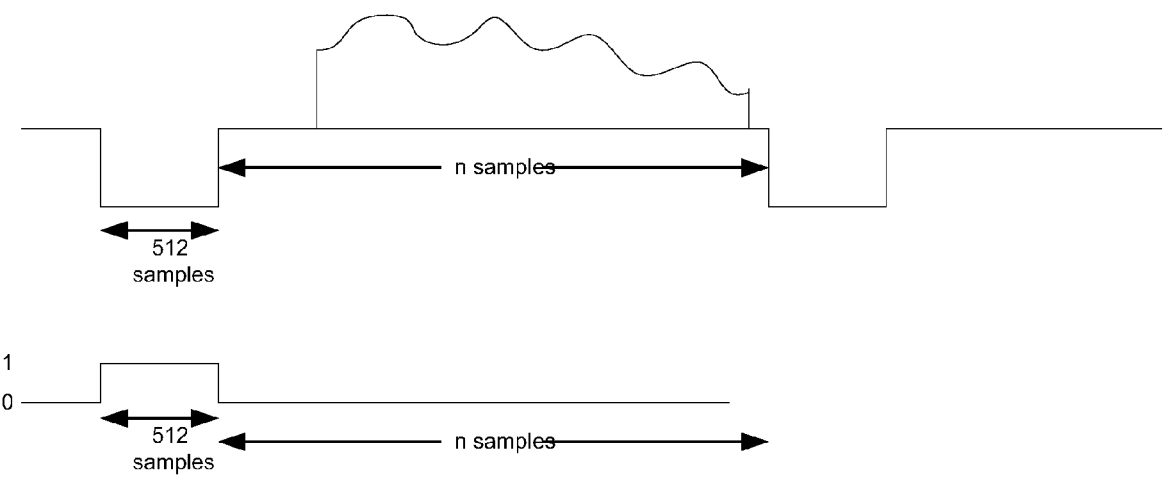
FIG. 11 is a schematic diagram of an input signal that is passed through a matched filter.

The frequency response of the Matched Filter 238 shown in FIG. 2 can be defined based on an assumption of an "ideal" HSync raster for national television standards committee ("NTSC") signals, for phase-alternating line ("PAL") signals, and for Sequential Color with Memory ("SECAM") signals, with the HSync pulse width being 512 samples (at the sample rate provided by the 108 MHz clock). As shown in FIG. 11, when the portion of a line corresponding to an HSync pulse is multiplied by 1 and the non-HSync portion of the line is multiplied by zero, then the output of the Matched filter reduces to a 512-sample running average. Thus, after being passed through the matched filter, Sync pulses can be easily identified from the CSync signal.

Thus, as explained above, an input CSync signal can be considered to belong to one of two categories: a high-noise or low-noise SD signal (e.g., as defined by formats 240p, 480i, 288p, or 576i listed in Table 1) or a low-noise ATSC signal (e.g., in a format listed in Table 1 including the 240p, 480i, 288p, and 576i formats), which can be a SD or an HD signal. Two paths shown in FIG. 2 are supplied to handle each of these cases: a path that includes the Gen AGC block 222 and a simple slicer 224 for the low-noise signals and a path that includes the SD AGC block 216, the matched filter 234, and a slicer 218 for the high-noise signals.

Once the low-noise case has been filtered and biased (using the DCR block 214 and the Gen AGC block 222, a programmable slice level can be used to identify the sync tips in the CSync signal. Analysis of the high-noise signal exploits the fact that all the applicable formats have a similar or identical timing for the sync width. Therefore, a fixed matched filter matched to this HSync width at the fixed sampling rate can be used to identify the sync region.

The Slicers 218 and 224 shown in FIG. 2 can be used to detect Sync pulses from the normalized and filtered signals in the low-noise and high-noise paths. The slicers act like threshold detectors in that they receive an input, and they output a positive signal whenever the input level is below a pre-determined threshold but otherwise set the output level equal to zero. The slicers shown in FIG. 2 do not distinguish HSync pulses from VSync pulses. However, that analysis can be performed by the Metric Extraction blocks 208 and 230 shown in FIG. 2.

Metrics that can be determined from the HSync and VSync pulses embedded within a CSync signal and that can later be used to identify uniquely a format in a format identification block 240 or 242 include: the HSync and VSync polarities (for PC inputs); the HSync width; the Line Length; the number of Lines/Field; and whether fields are progressive or interlaced. When computing each of these metrics, a hit (consistency) counter can be maintained, which increases if the value of the measured metric is consistent with a previously measured value of the same metric. Once the hits counter exceeds a VALID_THRESHOLD value, the metric is considered locked. Each metric becomes unlocked if the hit counter changes and fails below an INVALID_THRESHOLD value. Thus, a hysteresis is built into the metric extraction blocks to maintain a lock status on a metric, and to ensure that a lock is not established prematurely.

The metric extraction blocks 208 and 220 can identify a number of characteristic metrics about the input signals. For example, the polarity of the HSync and VSync pulses can be determined by monitoring the activity of the HSync and VSync lines. The Sync tip polarity can be defined as the polarity that is used less than 45% of the time during the display of a frame. The other metrics (i.e., the HSync width, the Line Length, the number of Lines/Field, and whether fields are progressive or interlaced) can be determined by monitoring the HSync pulses and VSync pulses either coming directly from the digital H and V sync channels 202 and 204 (i.e., for PC format signals shown in Table 2) or from the output of one of the Sync Detect (slicer) sub-blocks 224 or 218. Determining the HSync width and line length is straightforward given either the Digital HSync or Slicer output. The line length can be determined by measuring the distance between two rising edges, and the HSync width can be determined by measuring the distance between a rising edge and a falling edge. The ATSC input signal coming from the slicer 224 can distinguish VSync pulses from HSync pulses due to the increased "sync width" of the VSync pulses. VSync pulses can be a series of pulses (e.g., more than 4 pulses) where each pulse is longer than a multiple (e.g. 4) times of an established width of a HSync pulse. Alternatively, VSync pulses can be identified as single sync pulses that are longer than the established line length. These extended sync pulses are not confused with changing sync polarity, because ATSC CSync signals have a fixed polarity. The number of lines per field is computed by dividing the number of samples between two VSyncs (a field length) by the established line length. Whether the display is progressive or interlaced can be determined by counting the number of samples between the first VSync and first HSync of each field. If the number is consistent, the image is progressive, but if the number varies, the image is interlaced.

Figure 12:
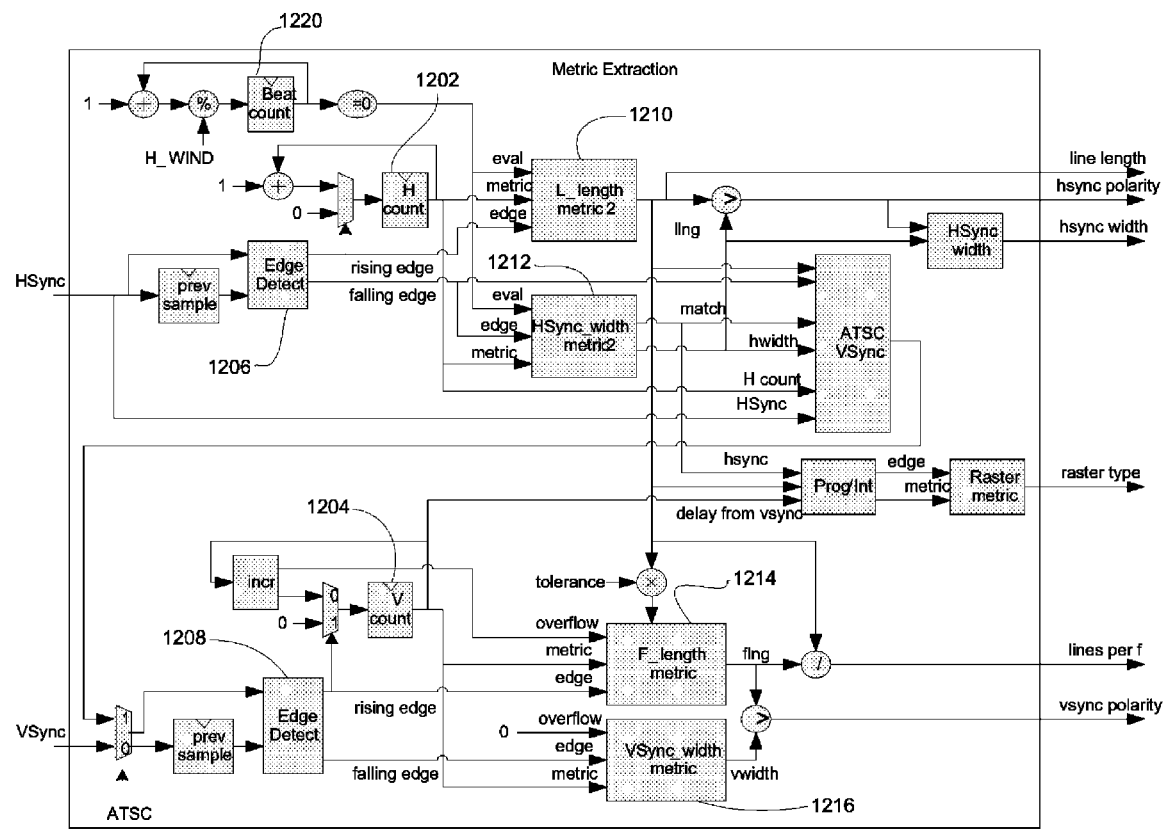
FIG. 12 is a schematic block diagram of a metric extraction circuit.

FIG. 12 is a schematic block diagram of details of a Metric Extraction block. Along the left-hand side of FIG. 12, running top to bottom, is a counter 1202 that maintain a count of the time between two rising HSync edges (the "HCount") and a counter 1204 that maintains a count of the time between two rising VSync edges (the "VCount"). Upon detection by an edge detector 1206 or 1208 of each of an edge corresponding to the occurrence of HSync or VSync pulse, the appropriate value is compared to a previous value inside a line length metric block 1210, an HSync width metric block 1212, a Frame length metric block 1214, or a VSync width metric block 1216 to determine the consistency of the measurement and whether the value is "locked." This is explained in more detail below with reference to FIG. 13. The remaining elements of FIG. 12 handle VSync identification (for ATSC input), Progressive/Interlaced determination, and final metric calculations.

As shown in FIG. 12, all counts can be measured in terms of sample counts. The tolerance for field length can be measured in n line lengths ("llng"). The VSync input can be bypassed for ATSC input signals because the VSync signal is embedded in the CSync signal that is assigned to the HSync input port. Because the HSync and VSync polarities are known for ATSC, therefore these ports can be ignored for ATSC inputs. The VSync width can be used to measure Vsync polarity, but it is unused for ATSC inputs. The output metrics can be calculated as follows: the number of lines per frame is determined by dividing flng by llng, i.e., lines_per_f=flng/llng. The HSync polarity can be determined by comparing hwidth to half the line length (hsync_polarity=hwidth<llng/2), and VSync polarity can be determined by comparing vwidth to half the frame length (vsync_polarity=vwidth<flng/2). The tolerance for various metrics from FIG. 12 is shown in Table 4 below.

TABLE 4

(Metric Tolerances)

| Field Name | Field Description | Field Assignments |
|---|---|---|
| LLENGTH_TOLERANCE[3:0] | Defines allowable tolerance of averaged LLNG measures | Valid range of measured LLNG is defined as: |

TABLE 4-continued (Metric Tolerances)

| Field Name | Field Description | Field Assignments |
| --- | --- | --- |
| | in samples | { LLNG − LLENGTH_TOLERANCE, LLNG + LLENGTH_TOLERANCE} |
| HWIDTH_TOLERANCE[3:0] | Defines allowable tolerance of averaged HWIDTH measured in samples | Valid range of measured HWIDTH is defined as: { HWIDTH − HWIDTH_TOLERANCE, HWIDTH + HWIDTH_TOLERANCE} |
| FLENGTH_TOLERANCE[3:0] | Defines allowable tolerance of averaged FLNG measures in LLNG | Valid range of measured FLNG is defined as: { FLNG − FLENGTH_TOLERANCE*LLNG, FLNG + FLENGTH_TOLERANCE*LLNG } |
| VWIDTH_TOLERANCE[3:0] | Defines allowable tolerance of averaged VWIDTH measured in samples | Valid range of measured VWIDTH is defined as: { VWIDTH − VWIDTH_TOLERANCE, VWIDTH + VWIDTH_TOLERANCE } |

Figure 13:
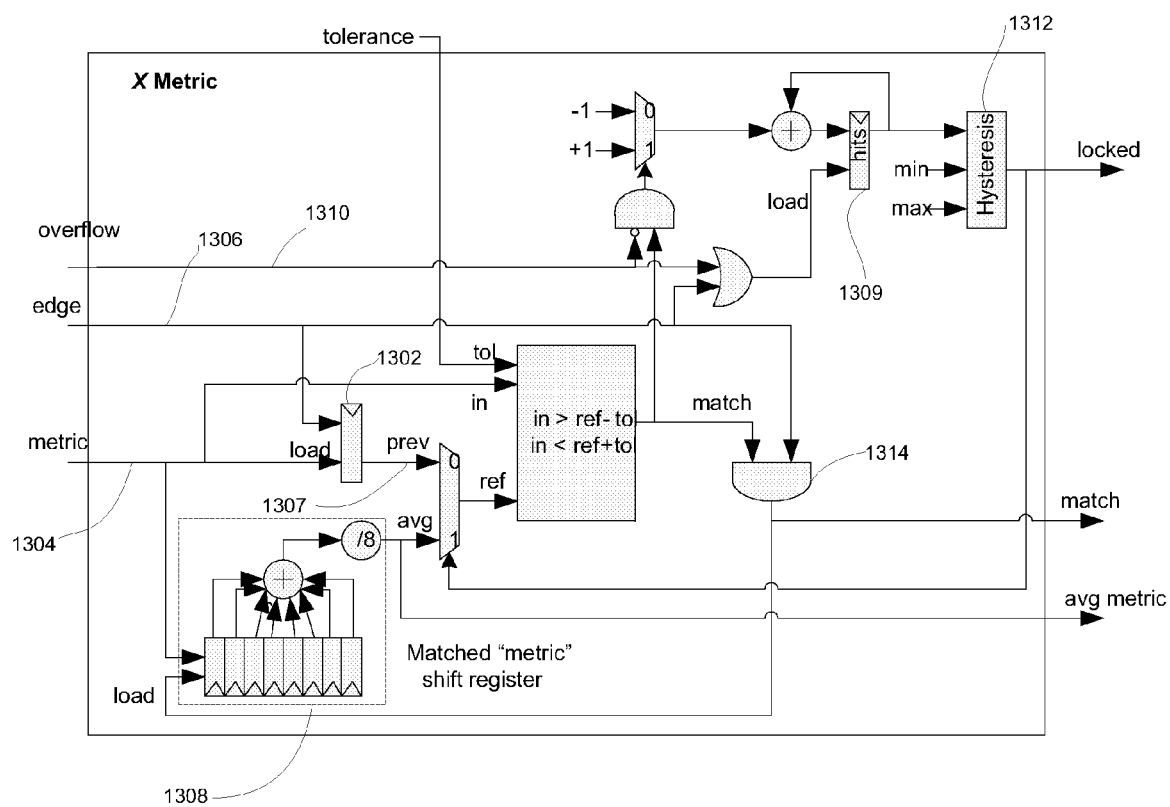
FIG. 13 is a schematic block diagram of a circuit for comparing new metric value to a previous value

FIG. 13 illustrates how a new metric value can be compared to a previous value for the F_length or VSync_width (i.e., identified as the "X" Metric in FIG. 13) parameters. Note the flops use a "load" signal to simplify the figure. A sub block 1302 shown in FIG. 13 receives two inputs: the metric input 1304, which provides a new value, and an edge input 1306, which triggers evaluation of the new value. The system can operate in an "unlocked" mode and in a "locked" mode. In these modes, the value can be compared to, respectively, the previous value or the average of the past n values that were rated as "matches," where n can be selected to equal 8, 4, or 2. The average value can be calculated by an averaging block 1308. A match can be said to exist when the new value is within the tolerance of the old reference value. A "hit" counter 1309 can be incremented or decremented each time there is a match or a mismatch. The third input, "overflow," 1310 can be used to decrement the hit count. This feature is used uniquely by the F_length metric to ensure that a constant input eventually unlocks the F_length. The lock status can be defined by the value of the hit counter as controlled through a register setting like those listed in Table 5 below. A sub block 1312 shown in FIG. 13 reports whether the metric is locked, and another block 1314 reports when a match happens.

Figure 14:
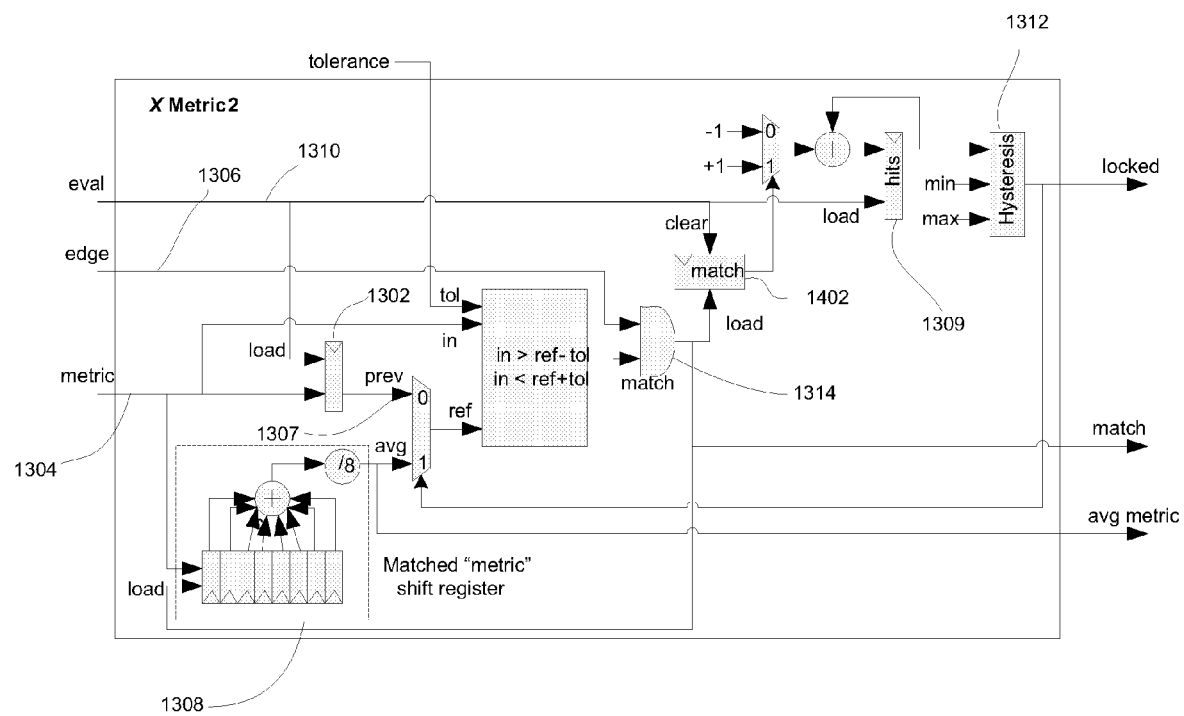
FIG. 14 is a schematic block diagram of a circuit for comparing metrics to previous values.

FIG. 14 shows a slightly different module that can be used to compare metrics to previous values for the L_length and HSync_width parameters. The figure is similar to FIG. 13, with the following exceptions. First there is no overflow logic. Secondly, the hit counter 1402 is not updated on the edge. Instead the result of the "match" test is flopped on the edge. Later when the "beat" counter 1220 (shown in FIG. 12) overflows, the status of the match counter 1404 can be used to increment (match is set) or decrement (match is cleared) the hit counter.

TABLE 5

| Field Name | Field Description | Field Assignments |
| --- | --- | --- |
| METRIC_HIT_MAX[6:0] | Defines the saturation value of the metric_hit counter. | Recommended value 127. |
| AVERAGE_SIZE[1:0] | Defines the number of elements from the shift register to be used for the average. 0 - two elements 1 - four elements 2 - eight elements 3 - sixteen elements | Recommended value 3 |
| VALID_THRESHOLD[6:0] | Defines the "on" hysteresis threshold. Previously calculated metric data is saved upon metric_hit counter reaching this value. | Recommended value 16. |
| INVALID_THRESHOLD[6:0] | Defines the "off" hysteresis threshold. Previously calculated metric data is allowed to be updated upon metric_hit counter reaching this value. | Recommended value 0. |

Referring to FIG. 14, to analyze VSync pulses, we note that there can be two types of ATSC VSyncs. A Standard VSync can have a series of NUM_SERR serration pulses in a row, where a serration is defined by a measured HSync width>SERR*avg_hsync_width (hwidth), where NUMM_SERR and SERR are programmable integer values (see bottom path of FIG. 14). A VCR VSync can have an HSync width=NUM_LINE*line_length (llng), which can be computed by comparing the HCount value AND by confirming the HSync input is still low, where NUM_LINE is a programmable integer value (see top path of FIG. 14).

Figure 15:
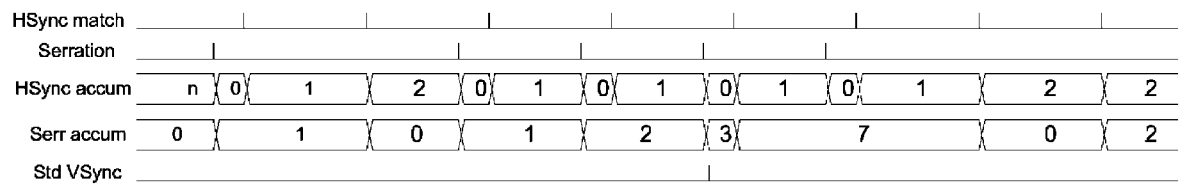
FIG. 15 is a schematic timing diagram showing how a count of a number of serration pulses can be maintained without a pair of Hsyncs in between the pulses.

The definition of "serration pulses in a row" is that we count the number of serration pulses without a pair of Hsyncs in between. This is required for tri-level formats that place Hsyncs between the serration pulses. FIG. 15 depicts how this count can be maintained using an HSync and a Serration accumulator. Upon each Serration pulse, the HSync accum can be cleared and the Serr accum can be incremented. Upon each "matched HSync" the HSync accum can be incremented. If the count of the HSync accum value reaches two, then the Serr accum value can be cleared. If the Serr accum value is allowed to accumulate to the specified NUM_SERR value, a Std VSync signal can be generated.

Figure 16:
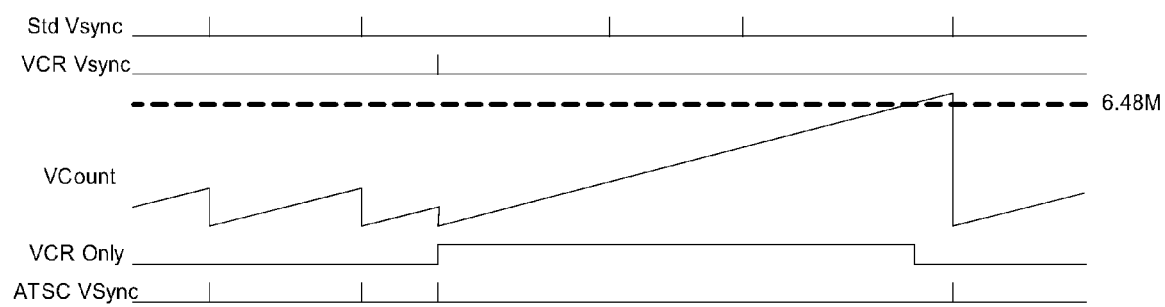
FIG. 16 is a schematic timing diagram showing how a standard VSync pulses can be distinguished from VCR VSync pulses.

An additional state machine can be introduced to select between the VCR VSync pulses and Standard VSync pulses, such that once a VCR VSync pulses is encountered standard VSync pulses are ignored, since they might reflect noise bursts. One should continue to require VCR VSync pulses until a period of three SD field lengths have passed without the occurrence of any VCR VSync pulse. At this point, one can revert to using standard VSyncs pulses. FIG. 16 depicts an expected waveform under this scenario. As shown in FIG. 16, once a VCR VSync pulse is detected, the system can assert a VCR-only mode as it resets a VCount signal to zero. Each time an additional VCR VSync pulse appears, the VCount signal can be reset to zero. The VCount signal counts samples between VCR VSyncs, and once the VCount exceeds a predetermined number (e.g., 6,480,000 (0x62c080)), the VCR-only mode can be disabled and standard VSyncs pulses can be allowed to set the ATSC VSync.

A raster type of in the input signal can be identified by monitoring the time between the detection of a VSync pulse and the first detection of a HSync pulse. The time can be determined by taking the VCount signal value on the rising edge of the first HSync pulse after the VSync pulse. The difference between this measure and the previous measure can be made, and if the difference is within +/−¼ line, then the raster type is considered progressive. While this measurement may occasionally mis-identify the raster type during trick streams, the identification of the exact raster type for ATSC inputs can be deferred to the VDEC with its more elaborate Field Identification system.

The final metrics can be reported in a register assignment similar to that displayed in to Table 6 below. The registers can be double buffered and available for software reads at any time, and the registers can be updated every time a VSync pulse is detected.

TABLE 6

| Field Name | Field Description | Field Assignment |
| --- | --- | --- |
| HSYNC_POLARITY | Defines the polarity of the incoming HSync signal. Positive polarity corresponds to a signal with "high" level shorter than the "low" level. | 0 - POSITIVE<br>1 - NEGATIVE |
| VSYNC_POLARITY | Defines the polarity of the incoming VSync signal. Positive polarity corresponds to a signal with "high" level shorter than the "low" level. | 0 - POSITIVE<br>1 - NEGATIVE |
| LINES_PER_FIELD[14:0] | Defines the number of lines per field as a quotient of the field length divided by an average line length measured during the preceding field. | An 11.4 number represents an accuracy of four fractional binary digits. Interlaced formats should have fractional bits set to 4b'1000 or close, progressive formats should have fractional bits set to 4b'0000 or close.<br>Note: exception is 1250i/50 format |
| LINE_LENGHT[12:0] | Average line length measured during the preceding field | A 13 bit number defines the average measured line length in terms of a number of system clock cycles. |
| HSYNC_WIDTH[9:0] | Average HSync width measured during the preceding field | A 10 bit number defines the average measured HSync width in terms of a number of system clock cycles. |
| RASTER_TYPE | Defines the raster type (interaced vs. progressive) | 0 - PROGRESSIVE<br>1 - INTERLACED |

Once the metric are measured, as described above, the metrics can be used to identify the format of the incoming analog video stream. Format identification can include three stages: determining when the format has changed; looking up the new format; and arbitrating between the formats identified by the Gen-AGC path used for low-noise input signals and by the SD-AGC path used for high-noise input signals.

A format change can be defined differently for the ATSC formatted input signals and PC formatted input signals inputs. The foundation for these different requirements is that the PC formats require Sync polarity values and Raster type identification (i.e., progressive or interlaced scanning) while ATSC signals do not. Thus, a format change can be defined to exist for an ATSC signal if a gain lock exists for both line length and field length, and then the lock is lost for either line length or field length, or the current metrics no longer match the identified format. A format change can be defined to exist for a PC signal if a gain lock exists for hwidth, line length, vwidth, field length and raster type and then the lock is lost of hwidth, line length, vwidth, field length or raster type or the current metrics no longer match the identified format.

If a format change is the result of losing a lock on a metric as described above, the format is listed as "MISSING_INPUT." If the required metrics are locked, then a new format index can be identified by comparing the current metrics to a list of formats attributes, which can be similar to the values listed in Table 7 below. The first match between the current metrics and a set of attributes can identify a format. The format index can be noted and reported to software. Additionally the format attributes can be copied locally to track future compliance with the selected format. If no format attribute set describes the current metrics, then the format is listed as "UNKNOWN."

TABLE 7

| Field Name | Field Description | Field Assignment |
|---|---|---|
| FT_HSYNC_POLARITY | This field is used for PC formats only. In case of ATSC signals format identification the value of this field is ignored. | 1 - POSITIVE<br>0 - NEGATIVE |
| FT_VSYNC_POLARITY | This field is used for PC formats only. In case of ATSC signals format identification the value of this field is ignored. | 1 - POSITIVE<br>0 - NEGATIVE |
| FT_LINES_PER_FIELD[14:0] | Defines a number of lines per field expected for a given format.<br>If this field is set to a value of "0", this field is ignored in the format identification process. | Four lsb bits of this field specify fractional value. Those bits should be set to:<br>4b'0000 for progressive formats and 1250/50<br>4b'1000 for interlaced formats except for 1250/50 |
| FT_DELTA_LPF[3:0] | Defines allowable tolerance of measured LINES_PER_FIELD value vs. the FT_LINES_PER_FIELD | Valid range of LINES_PER_FIELD is defined as:<br>{ FT_LINES_PER_FIELD – FT_DELTA_LPF,<br>FT_LINES_PER_FIELD + FT_DELTA_LPF } |
| FT_LINE_LENGHT[12:0] | Defines a line length expected for a given format. If this field is set to a value of "0", this field is ignored in the format identification process. | This number is given in a system clock samples. |
| FT_DELTA_LL[3:0] | Defines allowable tolerance of measured LINE_LENGHT value vs. the FT_LINE_LENGHT | Valid range of LINE_LENGHT is defined as:<br>{ FT_LINE_LENGHT – FT_DELTA_LL,<br>FT_LINE_LENGHT + FT_DELTA_LL } |
| FT_HSYNC_WIDTH[9:0] | Defines a HSync width expected for a given format. If this field is set to a value of "0", this field is ignored in the format identification process. | This number is given in a system clock samples. |
| FT_DELTA_HW[3:0] | Defines allowable tolerance of measured LINE_LENGHT value vs. the FT_LINE_LENGHT | Valid range of HSYNC_WIDTH is defined as:<br>{ FT_HSYNC_WIDTH – FT_DELTA_HW,<br>FT_HSYNC_WIDTH + FT_DELTA_HW } |
| FT_RASTER_TYPE[1:0] | Defines the raster type (interaced vs. progressive) | 2 - INTERLACED<br>1 - PROGRESSIVE<br>0 - DONT_CARE |

The table of format attributes can be stored in memory and can be accessed through a FORMAT_START memory address and a FORMAT_COUNT number. The system can wake up with FORMAT_COUNT=0, indicating that there are no formats to compare to. Once software sets the table values and the memory pointer, then the count can be set to the appropriate value.

Upon determining to look up a new format, the first element through FORMAT_COUNT entry of the table can be retrieved. Each attribute of the table can be compared to the corresponding metric if the attribute is non-zero. If each metric, corresponding to a non-zero attribute, lies within the range of the attribute, then the format is selected as correct. At the completion of each format identification cycle, the elements of Table 8 can be updated.

TABLE 8

(Format Ready Registers)

| Field Name | Field Description | Field Assignment |
|---|---|---|
| FORMAT_INDEX[9:0] | Defines the index of the input format. Maximum total number of formats supported is 1023. | Used by the SW to identify the format and generate appropriate VDEC settings.<br>0 = UNKNOWN<br>1 → 1023 = VALID FORMAT<br>Read only register field |
| MISSING_INPUT | Indicates that the metrics are unlocked | 1 = UNSTABLE METRICS<br>0 = LOCKED METRICS<br>Read only register field |
| NEW_FORMAT | Indicates to the SW that the format identification process is completed. This bit is set even if no valid formats were identified. | Read:<br>1 = READY<br>0 = NOT_READY<br>Write:<br>1 = RESET<br>0 = No Action |

To arbitrate between potential formats identified in the high-noise, matched filter path and in the low-noise, Gen AGC path, the format arbiter 244 of FIG. 2 can be used. The input format can be determined to be a "floating input" if the metrics extracted in the Metric Extraction blocks 208 and 220 remain unlocked after a programmable amount of time. If the metrics do lock, then the format is determined by the format arbiter 244 through a series of compares based on a programmable format table in memory. Format identification can read an entry from memory that lists values and tolerances for each metric. The first entry that describes the current metrics, within the defined tolerances, can be identified as the format of the analog input signal. If the entire table is read without a match, the current format can be labeled "undefined/invalid."

If the high-noise, matched filter path and in the low-noise, Gen AGC path both produce metrics that lock to a format, the format arbiter 244 can choose the format that locks first as the format to use in the system 100. Alternatively, in case of conflict between formats identified by the high-noise, matched filter path and the low-noise, Gen AGC path, the format arbiter 244 may select the format identified by a predetermined path.

Implementations of the various techniques described herein may be implemented in analog or digital electronic circuitry, or in computer hardware, firmware, software, or in combinations of them. In some implementations, the circuitry may be contained on a single chip, such that a system for implementing techniques described herein is implemented in a "system on a chip." Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of automatically identifying a format of a video signal, the video signal including HSync pulses, VSync pulses, and video display data, the method comprising:

receiving the video signal;

extracting information about timing and width characteristics of the HSync pulses and the VSync pulses from the video signal;
determining the format of the video signal based on the extracted information; and
filtering the received signal with a matched filter, wherein the matched filter is matched to a pre-determined width of the HSync pulses.

2. The method of claim 1, wherein determining the format of the video signal based on the extracted information comprises:
comparing the extracted information to characteristic information about a plurality of different formats;
selecting one of the formats based on a degree of correlation of the characteristic information about the selected format with the extracted information.

3. The method of claim 2, wherein the characteristic information about the plurality of different formats includes information about the polarity of the HSync pulses, the polarity of the VSync pulses, the line length, the number of lines per field used in the different formats, and whether the different formats use progressive or interlaced scanning.

4. The method of claim 1, further comprising normalizing a bias level of the received signal before extracting the information about the timing and width characteristics of the HSync pulses and the VSync pulses from the video signal.

5. The method of claim 1, further comprising normalizing a gain of the received signal before extracting the information about the timing and width characteristics of the HSync pulses and the VSync pulses from the video signal.

6. The method of claim 1, wherein the video signal is selected from the group consisting of a standard definition ATSC video signal and a high definition ATSC signal, the method further comprising determining whether the format of the signal corresponds to a standard definition signal or an ATSC signal based on the extracted information.

7. The method of claim 1, further comprising:
filtering the received signal through a low pass filter; and
filtering the received signal through a matched filter.

8. The method of claim 1, further comprising configuring a video decoder to process the input signal and output an output signal to a display device in the determined format.

9. The method of claim 1, further comprising:
filtering the received signal through a low pass filter;
normalizing a bias level of the low-pass-filtered signal;
normalizing a first gain of the bias-level-normalized signal;
extracting first information about characteristics of the HSync pulses and the VSync pulses from the first-gain-normalized signal;
determining a hypothetical first format based on the extracted first information;
normalizing a second gain of the bias-level-normalized signal;
filtering the second-gain-normalized signal with the matched filter;
extracting second information about characteristics of the HSync pulses and the VSync pulses from the match-filtered signal;
determining a hypothetical second format based on the extracted second information; and
selecting the hypothetical first format or the hypothetical second format as the format of the input signal based on predetermined lookup table.

10. A system for automatically identifying a format of a video signal, the video signal including HSync pulses, VSync pulses, and video display data, the system comprising:
first bias and offset circuitry adapted for receiving the video signal and adjusting a bias level and a gain level of the signal, such that the minimum and maximum levels of the adjusted input signal conform to predetermined minimum and maximum levels;
second bias and offset circuitry adapted for receiving the video signal and adjusting a bias level and a gain level of the signal, such that the minimum and maximum levels of the adjusted input signal conform to predetermined minimum and maximum levels;
a matched filter adapted to receive the input signal adjusted by the second bias and offset circuitry and tuned to filter the received signal based on a predetermined width of HSync pulses in the received signal;
sync pulse detection circuitry adapted for detecting HSync and VSync pulses in the input signal adjusted by the first bias and offset circuitry and adapted for detecting HSync and VSync pulses in the filtered signal;
metric extraction circuitry adapted for extracting information about timing and width characteristics of the detected HSync pulses and the VSync pulses; and
format identification circuitry adapted to identify a format of the video signal based on a comparison of the extracted information with predetermined characteristics of known formats.

11. The system of claim 10, wherein the system is located on a single chip.

12. The system of claim 10, further comprising a low pass filter adapted to filter the input signal before the bias and gain levels of the signal are adjusted.

13. The system of claim 10, further comprising:
separate first sync pulse detection circuitry adapted for detecting HSync and VSync pulses in the input signal adjusted by the first bias and offset circuitry and second sync pulse detection circuitry adapted for detecting HSync and VSync pulses in the filtered signal;
separate first metric extraction circuitry adapted for extracting information about timing and width characteristics of the detected HSync pulses and the VSync pulses detected by the first sync pulse detection circuitry and second metric extraction circuitry adapted for extracting information about timing and width characteristics of the detected HSync pulses and the VSync pulses detected by the second sync pulse detection circuitry; and
separate first format identification circuitry adapted to identify a format of the video signal based on a comparison of the extracted information about timing and width characteristics of the detected HSync pulses and the VSync pulses detected by the first sync pulse detection circuitry with predetermined characteristics of known first formats and second format identification circuitry adapted to identify a format of the video signal based on a comparison of the extracted information about timing and width characteristics of the detected HSync pulses and the VSync pulses detected by the second sync pulse detection circuitry with predetermined characteristics of known second formats.

14. The system of claim 13, wherein the known second formats comprise standard definition formats.

15. The system of claim 13, further comprising a format arbiter to arbitrate between a format identified by the first format identification circuitry and a format identified by the second format identification circuitry.

16. The system of claim 10, wherein the predetermined characteristics comprise information about the polarity of the HSync pulses, the polarity of the VSync pulses, a line length, a number of lines per field used in the different formats, and whether the different formats use progressive or interlaced scanning.

17. The system of claim 10, wherein the video signal is a signal selected from the group consisting of a standard definition ATSC video signal and a high definition ATSC video signal, the method further comprising determining whether the format of the signal corresponds to a standard definition signal or an ATSC signal based on the extracted information.

18. A system for automatically identifying a format of a video signal, the video signal including HSync pulses, VSync pulses, and video display data, the system comprising:
   first bias and offset circuitry adapted for receiving the video signal and adjusting a bias level and a gain level of the signal, such that the minimum and maximum levels of the adjusted input signal conform to predetermined minimum and maximum levels;
   second bias and offset circuitry adapted for receiving the video signal and adjusting a bias level and a gain level of the signal, such that the minimum and maximum levels of the adjusted input signal conform to predetermined minimum and maximum levels;
   a filter adapted to receive the input signal adjusted by the second bias and offset circuitry and tuned to filter the received signal based on a predetermined width of HSync pulses in the received signal;
   separate first sync pulse detection circuitry adapted for detecting HSync and VSync pulses in the input signal adjusted by the first bias and offset circuitry and second sync pulse detection circuitry adapted for detecting HSync and VSync pulses in the filtered signal;
   separate first metric extraction circuitry adapted for extracting information about timing and width characteristics of the detected HSync pulses and the VSync pulses detected by the first sync pulse detection circuitry and second metric extraction circuitry adapted for extracting information about timing and width characteristics of the detected HSync pulses and the VSync pulses detected by the second sync pulse detection circuitry; and
   separate first format identification circuitry adapted to identify a format of the video signal based on a comparison of the extracted information about timing and width characteristics of the detected HSync pulses and the VSync pulses detected by the first sync pulse detection circuitry with predetermined characteristics of known first formats and second format identification circuitry adapted to identify a format of the video signal based on a comparison of the extracted information about timing and width characteristics of the detected HSync pulses and the VSync pulses detected by the second sync pulse detection circuitry with predetermined characteristics of known second formats.

19. The system of claim 18, wherein the first format identification circuitry is adapted to identify a format of a high definition ATSC video signal and wherein the second format identification circuitry is adapted to identify a format of the standard definition ATSC video signal.

* * * * *